(12) United States Patent
Gubelmann et al.

(10) Patent No.: US 12,534,896 B2
(45) Date of Patent: Jan. 27, 2026

(54) MOUNTING SYSTEM FOR SANITARY FITTINGS

(71) Applicant: GEBERIT INTERNATIONAL AG, Jona (CH)

(72) Inventors: Silvan Gubelmann, Jona (CH); Manuel Lechner, Kaltbrunn (CH)

(73) Assignee: GEBERIT INTERNATIONAL AG, Jona (CH)

( * ) Notice: Subject to any disclaimer, the term of this patent is extended or adjusted under 35 U.S.C. 154(b) by 278 days.

(21) Appl. No.: 18/161,489

(22) Filed: Jan. 30, 2023

(65) Prior Publication Data

US 2023/0243140 A1 Aug. 3, 2023

(30) Foreign Application Priority Data

Feb. 2, 2022 (EP) ..................................... 22154756

(51) Int. Cl.
*E03D 11/14* (2006.01)
*E03C 1/322* (2006.01)

(52) U.S. Cl.
CPC ............ *E03D 11/143* (2013.01); *E03C 1/322* (2013.01)

(58) Field of Classification Search
CPC ..... E03D 11/143; E03D 11/146; E03C 1/322; E03C 1/324; A47K 2201/00; A47K 2201/02; A47K 2201/025
See application file for complete search history.

(56) References Cited

FOREIGN PATENT DOCUMENTS

| CH | 663047 A5 | * 11/1987 |
| EP | 0860559 A1 | * 8/1998 |
| EP | 1 231 328 A2 | 8/2002 |
| EP | 3 441 535 A1 | 2/2019 |
| IT | VR20 100 125 A1 | 12/2011 |

OTHER PUBLICATIONS

Search Report for EP 22 15 4756 dated Jul. 6, 2022.

* cited by examiner

*Primary Examiner* — Erin Deery
(74) *Attorney, Agent, or Firm* — Sughrue Mion, PLLC

(57) ABSTRACT

A mounting system for fastening a sanitary fitting having a mounting frame having at least one hollow profile, the side walls of which define an internal space The frame has an end face at the end thereof, and the frame has at least one bearing structure for mounting a sanitary fitting. At least one fastening unit is provided with a support element with a guide receptacle and a fastening tab which is mounted in the guide receptacle so as to slide relative to the support element from a starting position into a mounting position. The support element can be inserted in the internal space of the hollow profile, and, in the mounting position, the fastening tab extends out of the guide receptacle and out of the internal space beyond the end face of the hollow profile.

19 Claims, 8 Drawing Sheets

MOUNTING SYSTEM FOR SANITARY FITTINGS

TECHNICAL FIELD

The present invention relates to a mounting system for sanitary fittings according to claim 1 and to a method for assembling the mounting system according to claim 17.

PRIOR ART

EP 3 441 535 discloses a mounting frame which has a frame corner which is provided by a cut and a folding process. A connecting piece can be inserted in the frame corner. In this case, the connecting piece has a fastening tab which is arranged so as to be pivotable relative to the connecting piece by means of a bending process.

The disadvantage of EP 3 441 535 is that the fastening tab is bent about a bending point provided by the fastening tab for the purpose of pivotability. In the region of the bending point, this leads to unwanted stress on the material, which can have a negative impact on the mechanical strength. The general mounting stability of the system disclosed in EP 3 441 535 is thus weakened.

SUMMARY OF THE INVENTION

Starting from this prior art, the invention addresses the problem of providing a mounting system for sanitary fittings which overcomes the disadvantages of the prior art. In particular, one problem addressed by the present invention is that of providing a mounting system for sanitary fittings which can be adapted more flexibly to the mounting situation on site provided that there is mechanically strong fastening.

This object is solved by a mounting system according to claim 1. Accordingly, a mounting system for fastening a sanitary fitting comprises a mounting frame and at least one fastening unit. The mounting frame comprises at least one hollow profile, the side walls of which define an internal space. At the end thereof, the hollow profile has an end face. The mounting frame further comprises at least one bearing structure for bearing a sanitary fitting. The support element comprises a guide receptacle and a fastening tab which is mounted in the guide receptacle so as to be able to slide relative to the support element from a starting position into a mounting position. The support element is/can be inserted in the internal space of the hollow profile. In the mounting position, the fastening tab extends out of the guide receptacle and out of the internal space, that is to say from the internal space beyond the end face of the hollow profile.

In the mounting position, the fastening tab forms a free end which can then be fastened to a supporting structure, such as to a wall of a building, to a support or to another structure fixedly arranged in a space.

The movable or slidable mounting of the fastening tab in the guide receptacle provides the advantage that, during the movement of the fastening tab, there is no negative effect on the mechanical stability of the fastening tab. The fastening tab can be slid back and forth between the starting position and the mounting position multiple times without the stability thereof being impaired.

The fastening tab can be pulled out of the guide receptacle and thus also out of the internal space. This has the advantage that, when the mounting situation requires the use of the fastening tab, the fastening tab can be pulled out of the guide receptacle and that, when the mounting situation does not require the use of the fastening tab, the fastening tab remains in the guide receptacle.

The end face forms the end of the hollow profile.

The support element can be inserted in the internal space and, when inserted, is fixed in the internal space. During the process of pulling out the fastening tab, the support element accordingly does not move relative to the hollow profile.

In the installed position, the hollow profile preferably extends in the vertical direction, and the end face is located in the horizontal direction. In this case, the support element is located at the upper end of the hollow profile. The fastening tab can be pulled upwards out of the hollow profile in the vertical direction.

The expression that the fastening element is slidable relative to the guide receptacle is understood to mean that the fastening element as a whole can be slid relative to the fixed support element inside the guide.

Preferably, there is one fastening unit per hollow profile.

Preferably, the guide receptacle is in the form of a longitudinal guide, the fastening tab being slidable substantially in the direction of a longitudinal axis of the longitudinal guide. The longitudinal axis extends preferably parallel to the profile axis of the hollow profile.

Preferably, in the mounting position, the support element and the fastening tab are located flush with the end face of the hollow profile or set back in the internal space with respect to the end face of the hollow profile in such a way that, in the starting position, both the support element and the fastening tab are located completely in the internal space. In the mounting position, the fastening tab extends from the internal space beyond the end face. In another embodiment, the support element can also protrude slightly out of the internal space so that said element protrudes beyond the end face, in the starting position, the fastening tab being located completely in the guide receptacle.

In one development, the support element can be designed in such a way that the support element is in the form of a cover which closes the access to the internal space of the hollow profile.

The hollow profile and the support element preferably have an aperture through which the fastening tab can be gripped and can be moved from the starting position into the mounting position. The aperture extends through the side wall of the hollow profile.

The fastening tab preferably has a guide portion and a fastening portion, in the mounting position, the fastening portion being located outside the guide receptacle, and the guide portion being located inside the guide receptacle.

In the starting position, the fastening portion is located at least in part or in full in the guide receptacle.

The fastening portion is preferably connected to the guide portion by means of a shoulder portion, the shoulder portion being designed in such a way that a mounting face of the fastening portion comes to lie substantially flush with an outer face of the hollow profile.

The fastening portion preferably has at least one fastening opening through which a fastening screw can be guided. Most preferably, a plurality of fastening openings are arranged, which has the advantage that the installer can use the fastening opening that suits the mounting situation.

The guide receptacle preferably has a first guide face and a second guide face, the fastening tab being located between the first guide face and the second guide face, and at least one of the two guide faces having a spring tension applied thereto by a spring element in such a way that the fastening tab is clamped between the two guide faces. The two guide faces preferably extend parallel to one another.

In this case, the thickness of the spring element is selected in such a way that it is still possible to pull out the guide tab. In particular in such a way that it is impossible for the spring element to slide out due to its own weight.

The guide receptacle preferably has two lateral guide faces which extend substantially at right angles away from the first guide face or the second guide face.

In the mounting position, the fastening tab preferably engages on the support element and/or on the hollow profile by means of a snap connection.

The snap connection is preferably provided by a snap-in tab on the fastening tab and a snap-in opening in the support element or in the hollow profile. Alternatively, the snap-in tab is located on the support element or on the hollow profile, and the snap-in opening is located in the fastening tab.

The support element preferably has side walls having outer wall faces. The outer wall faces have a cross-sectional shape which is substantially the same as the cross-sectional shape of the internal space of the hollow profile.

Preferably, at least one spring portion protrudes from at least one of the wall faces and acts against the inner wall of the hollow profile.

The side walls of the support element preferably define a hollow space, the spring element protruding from an inner wall face of one of the side walls, and the side wall opposite the spring element providing the first guide face.

The support element is preferably fastened in the internal space of the hollow profile by means of at least one snap connection.

Preferably, the snap connection is provided by a snap-in tab integrally formed on the support element, which tab engages in a snap-in opening located in the hollow profile. Alternatively, the snap connection is provided by a snap-in tab integrally formed on the hollow profile, which tab engages in a snap-in opening located in the support element.

Preferably, the support element and the hollow profile each have a stop, the two stops being in contact with one another when the support element is inserted.

The hollow profile, on two sides which are opposite one another with respect to the internal space, preferably has one opening in each case The support element also has an opening, in the inserted state, the two aforementioned openings providing a continuous mounting opening for a fastening screw.

By means of the fastening screw, the mounting device can be fastened in addition to the fastening by means of the fastening tab or as an alternative to the fastening by means of the fastening tab.

The spring element preferably also has an opening which provides part of the aforementioned mounting opening.

Preferably, the support element is made of plastics material, and the fastening tab is made of metal.

Preferably, the hollow profile is a vertical support, and the mounting device has two vertical supports extending at a distance from one another, the mounting device further having at least one cross member which is rigidly connected to the vertical supports and which interconnects the vertical supports, the cross member having the aforementioned bearing structure.

An assembly comprises a mounting system according to the above description and at least one sanitary fitting which is fastened to the bearing structure. The sanitary fitting is for example a toilet bowl, a urinal, a washbasin, a cistern or another water-bearing element.

A method for assembling a mounting system according to the above description is characterized in that, in a first step, the mounting device is positioned and in that, in particular, when required by the mounting situation, in a subsequent second step, the fastening tab is slid from the starting position into the mounting position.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
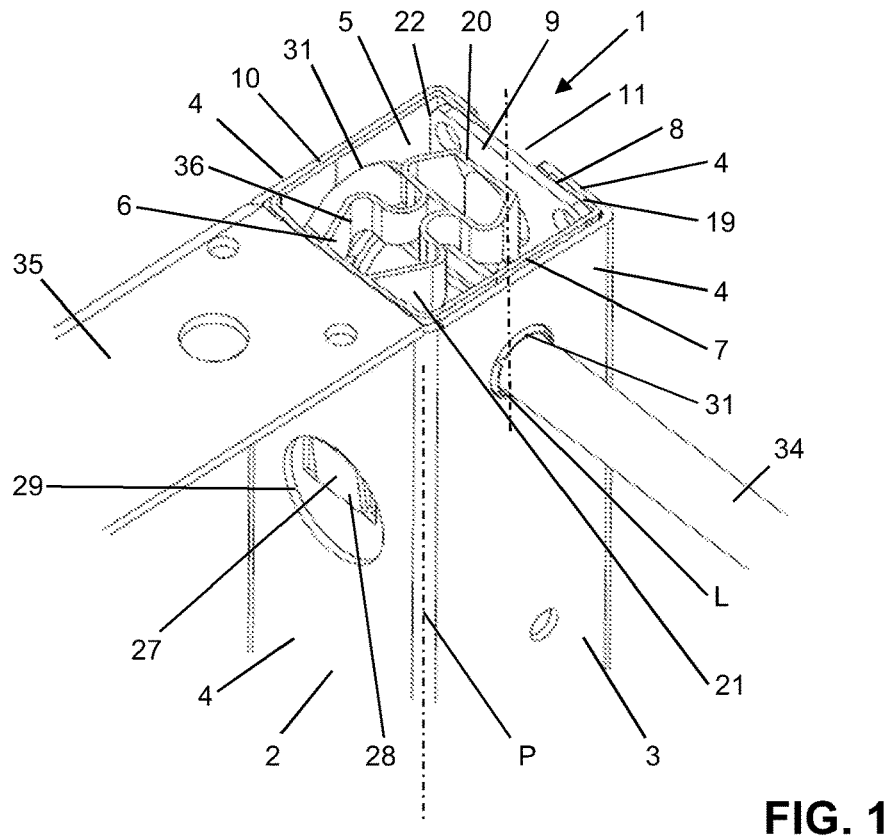
FIG. 1 shows a perspective view of the mounting system according to one preferred embodiment of the present invention in the starting position.

In the drawings, a mounting system 1 for fastening a sanitary fitting is shown. The mounting system 1 comprises a mounting frame 2 and a fastening unit 6. By means of the fastening unit 6, the mounting frame 2 can be fastened to a supporting structure, such as a wall of a building or a profile element.

Figure 8:
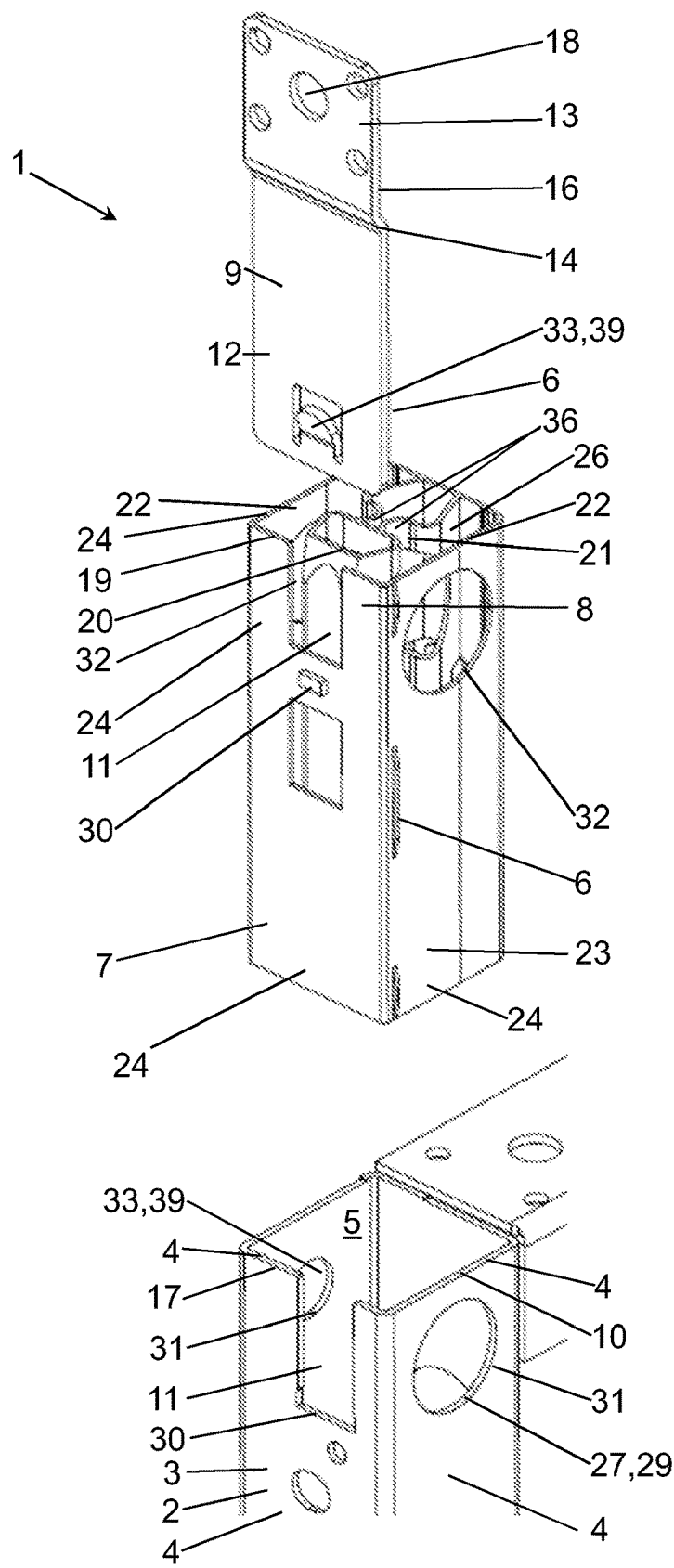
FIG. 8 shows another perspective exploded view of the mounting system according to the preceding drawings.
Figure 9:
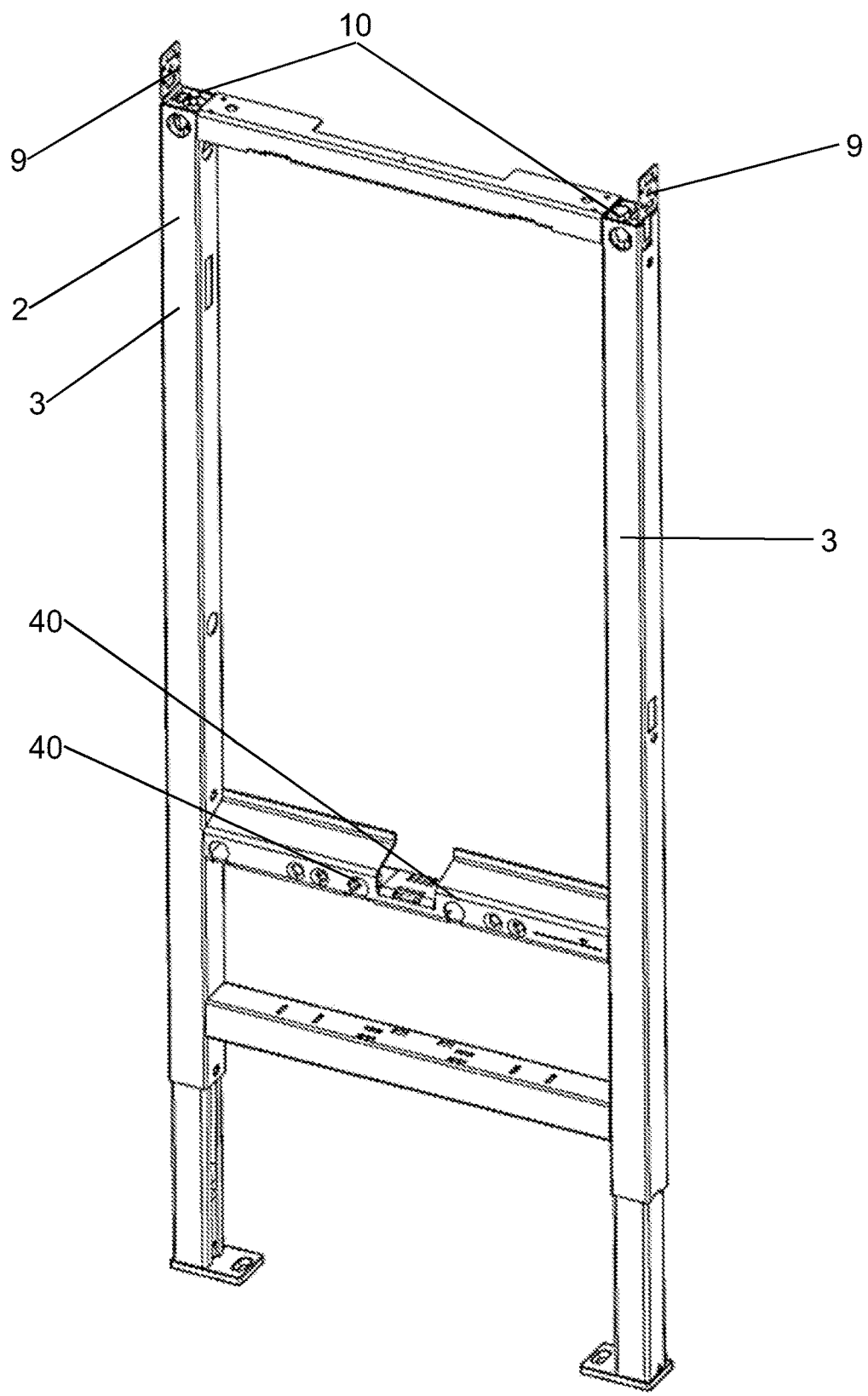
FIG. 9 a perspective view of the mounting system according to the previous figures.
Figure 10:
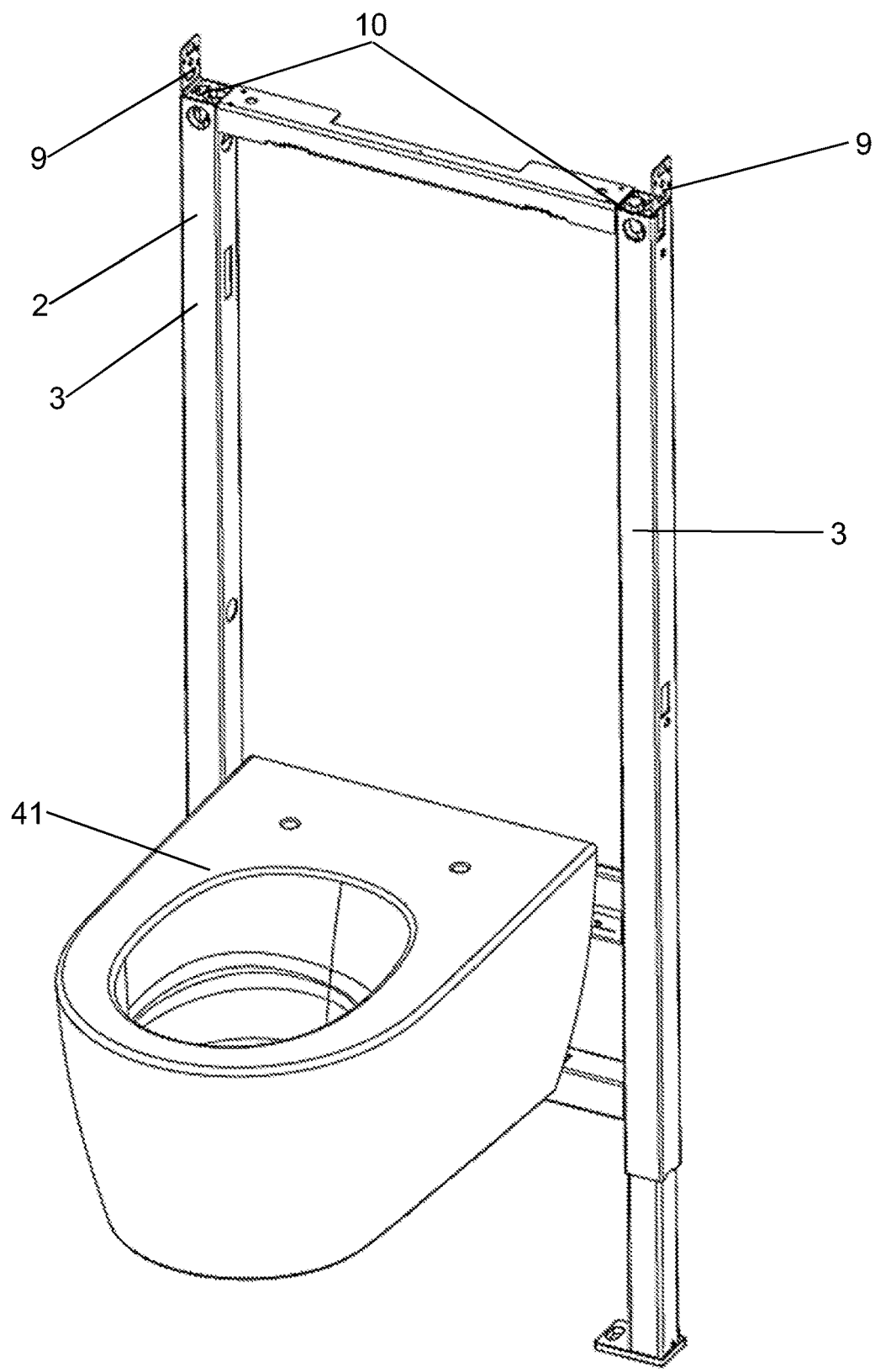
FIG. 10 a perspective view of an assembly with the mounting system according to the previous figures and with a sanitary fitting.

The mounting frame 2 comprises at least one hollow profile 3 which is in the form of a vertical support in the embodiment shown. The hollow profile 3 has side walls 4 which define an internal space 5. The hollow profile 3 extends along a profile axis P. At the end thereof, the hollow profile 3 has an end face 10. In the region of the end face 10, the hollow profile 3 has an open design. In the embodiment shown, the mounting frame 2 further comprises a cross member 35 which in this case extends away from the upper end of the hollow profile 3 and is oriented substantially at right angles to the profile axis P. In the installed position, the cross member 35 extends in the horizontal direction. Typically, another hollow profile (as shown in FIGS. 8 and 9) is arranged on the other side of the cross member 35, said hollow profile forming another vertical support. Furthermore, the mounting frame 2 can have additional cross members.

The mounting frame 2 further comprises at least one bearing structure, on which a sanitary fitting can be mounted, that is to say rigidly fastened. The bearing structure is for example a threaded opening into which a threaded rod can be screwed. The bearing structure is preferably fastened to one of the above-mentioned cross members.

Figure 2:
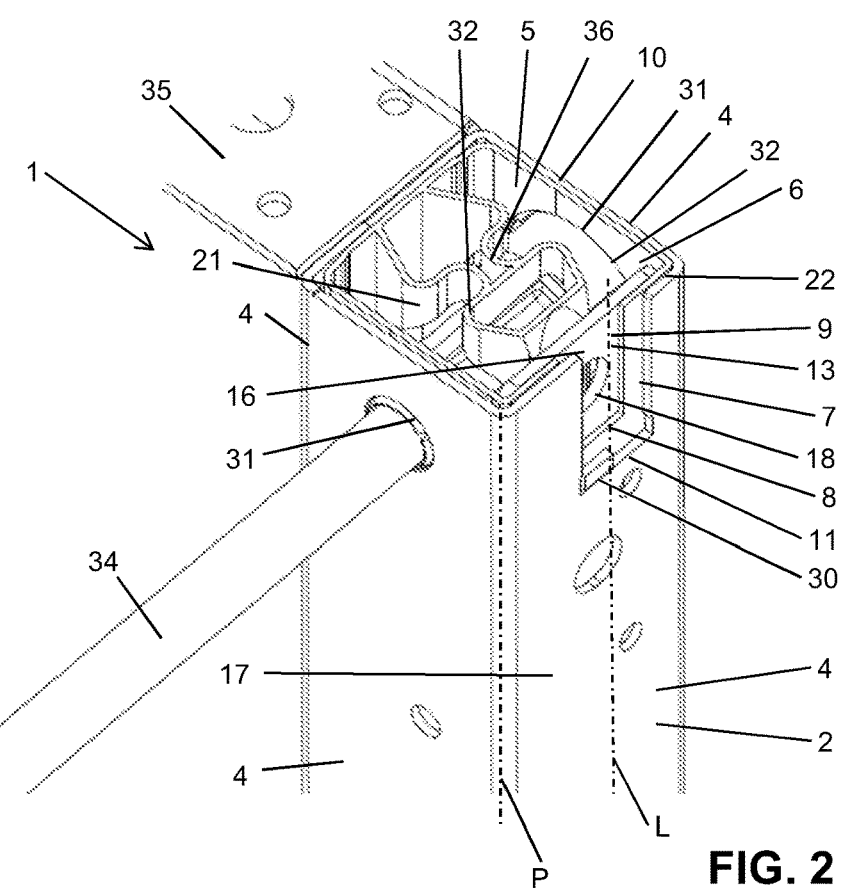
FIG. 2 shows the view according to FIG. 1 from another perspective.
Figure 3:
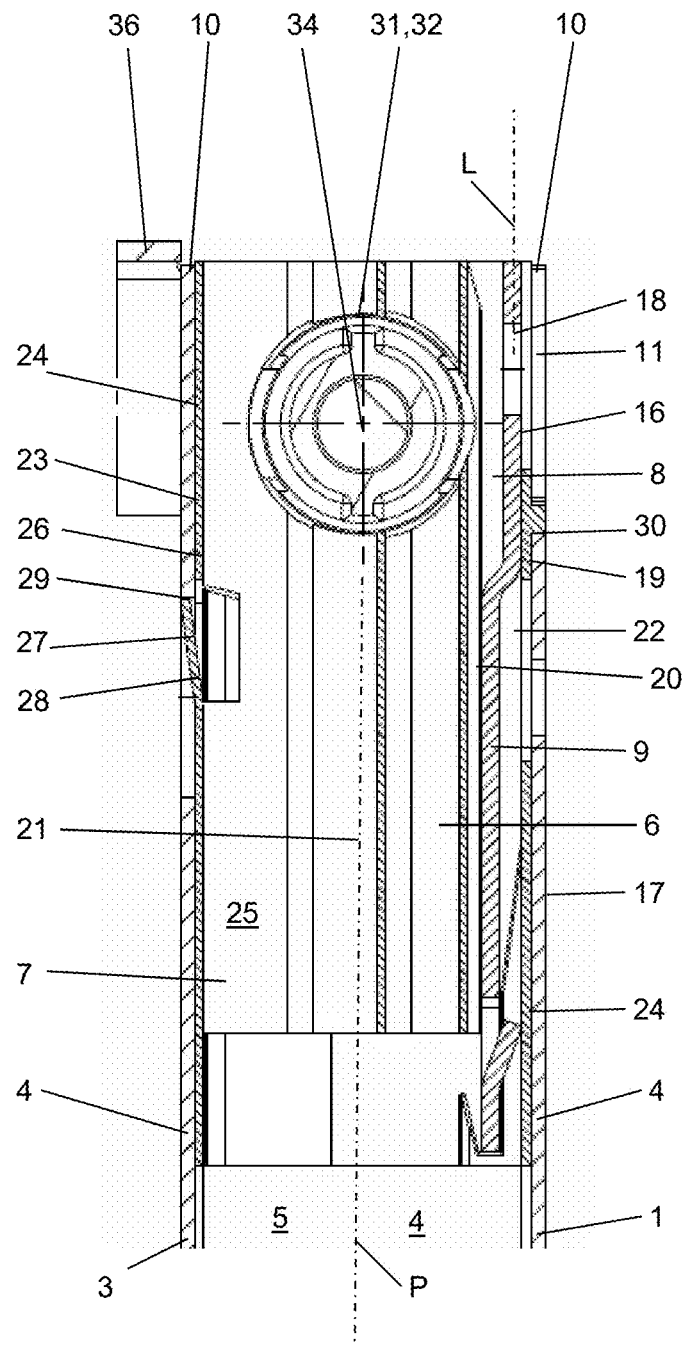
FIG. 3 shows a sectional view of the mounting system according to FIG. 1.
Figure 4:
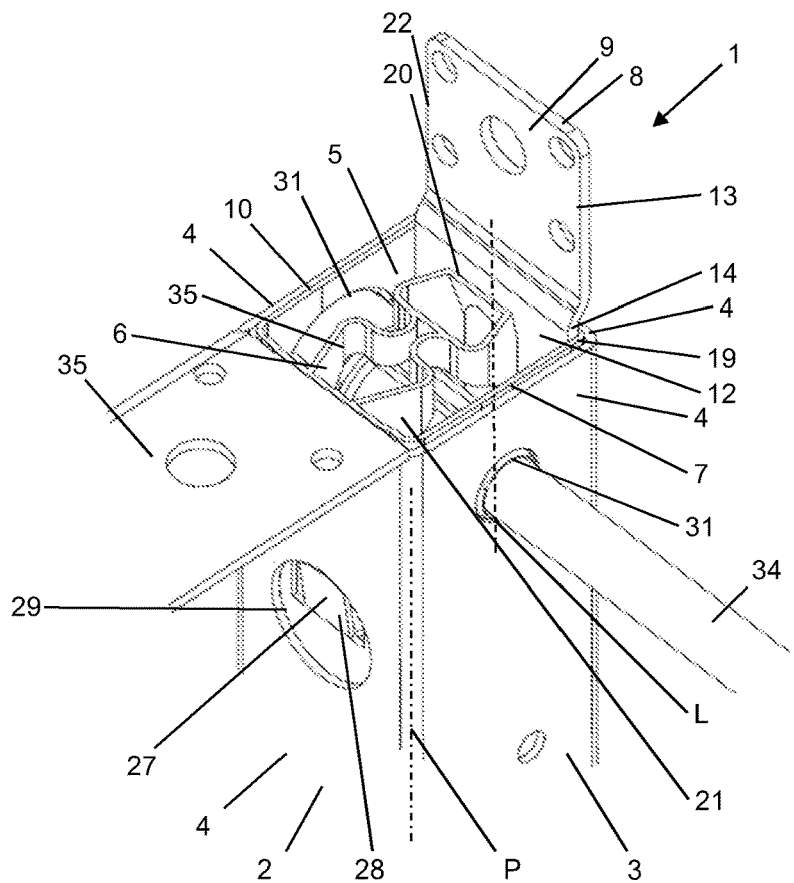
FIG. 4 shows a perspective view of the mounting system according to FIG. 1 in the mounting position.
Figure 5:
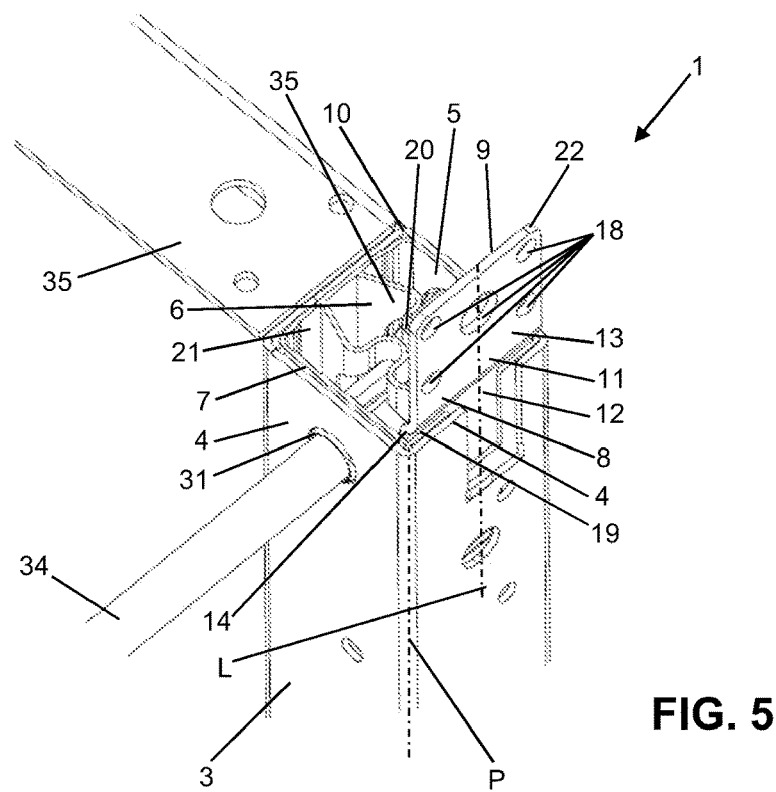
FIG. 5 shows the view according to FIG. 4 from another perspective.
Figure 6:
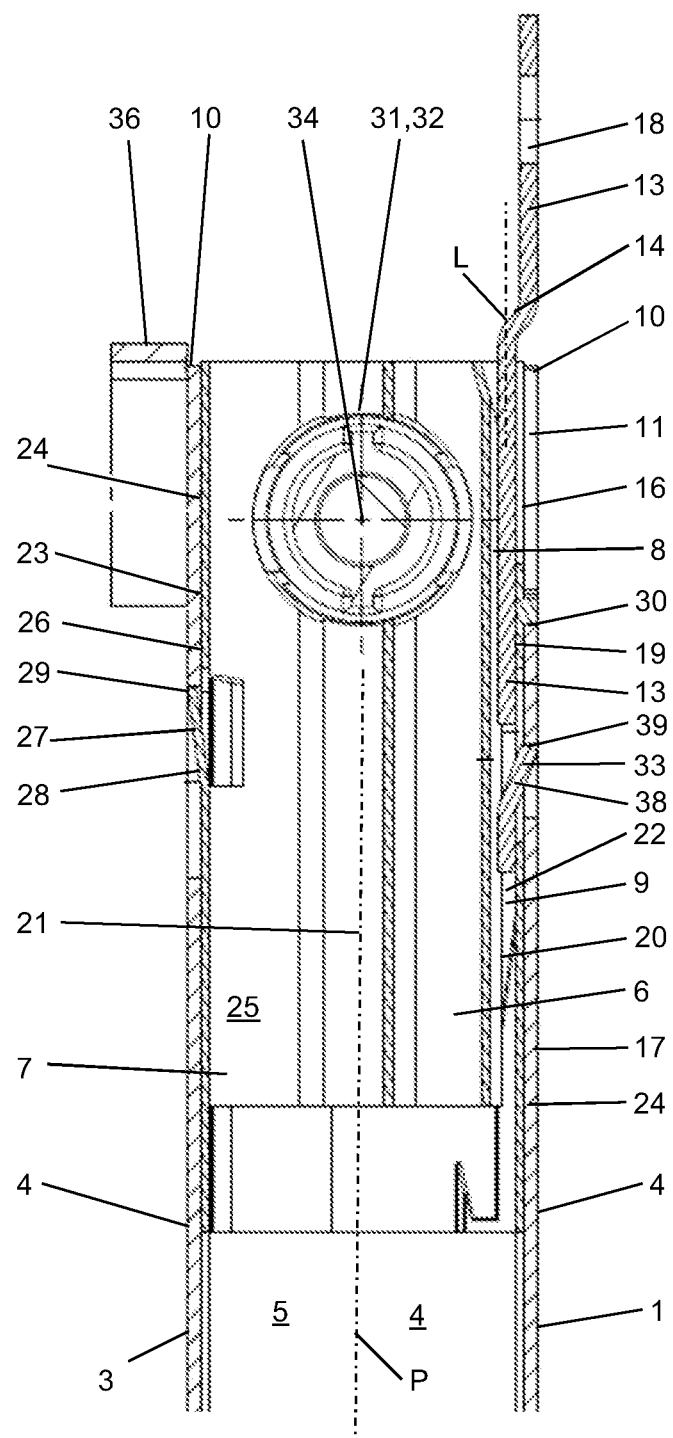
FIG. 6 shows a sectional view of the mounting system according to FIG. 4.

The fastening unit 6, as shown in FIGS. 1 and 2, is inserted from above into the internal space 5 of the hollow profile 3. The fastening unit 6 comprises a support element 7, which has a guide receptacle 8, and a fastening tab 9 which is movably mounted in the guide receptacle 8. The fastening tab 9 is mounted in the guide receptacle 8 so as to be able to slide relative to the fixed support element 7 from a starting position into a mounting position. In FIGS. 1 to 3, the fastening tab 9 is shown in the starting position. In FIGS. 4 to 6, the fastening tab 9 is shown in the mounting position. In the mounting position, the part of the fastening tab 9 which projects out of the guide receptacle 8 or out of the internal space 5 is inserted to fasten the mounting frame 2.

The support element 7 can be inserted into the internal space 5 of the hollow profile 3. In the mounting position, the fastening tab 9 projects out of the guide receptacle 8 and out of the internal space 5 beyond the end face 10 of the hollow profile 3. The fastening tab 9 can then be inserted to mechanically fasten the mounting system 1 with respect to a supporting structure, such as a wall or another profile.

From FIGS. 1 to 6, it can be seen that the support element 7 is located completely inside the internal space 5 of the hollow profile 3. When viewed from the internal space 5, the support element 7 does not extend beyond the end face 10. In the starting position, the fastening tab 9 is also located completely inside the internal space 5. In the starting position, the fastening tab 9 accordingly does not extend beyond the end face 10. In the mounting position, the fastening tab 9, as mentioned above, extends beyond the end face 10.

The guide receptacle 8 is in the form of a longitudinal guide. In this case, the longitudinal guide is designed in such a way that the fastening tab 9 is slidable substantially in the direction of a longitudinal axis L of the longitudinal guide. The longitudinal axis L is oriented parallel to the profile axis P of the hollow profile 3.

From FIGS. 2 and 5, it can be seen that the hollow profile 3 and the support element 7 have an aperture 11. The aperture 11 is arranged in such a way that the fastening tab 9 can be gripped through the aperture 11 from the outside and can be moved from the starting position into the mounting position. The aperture extends through the side walls of the hollow profile 3 and the support element 7.

Figure 7:
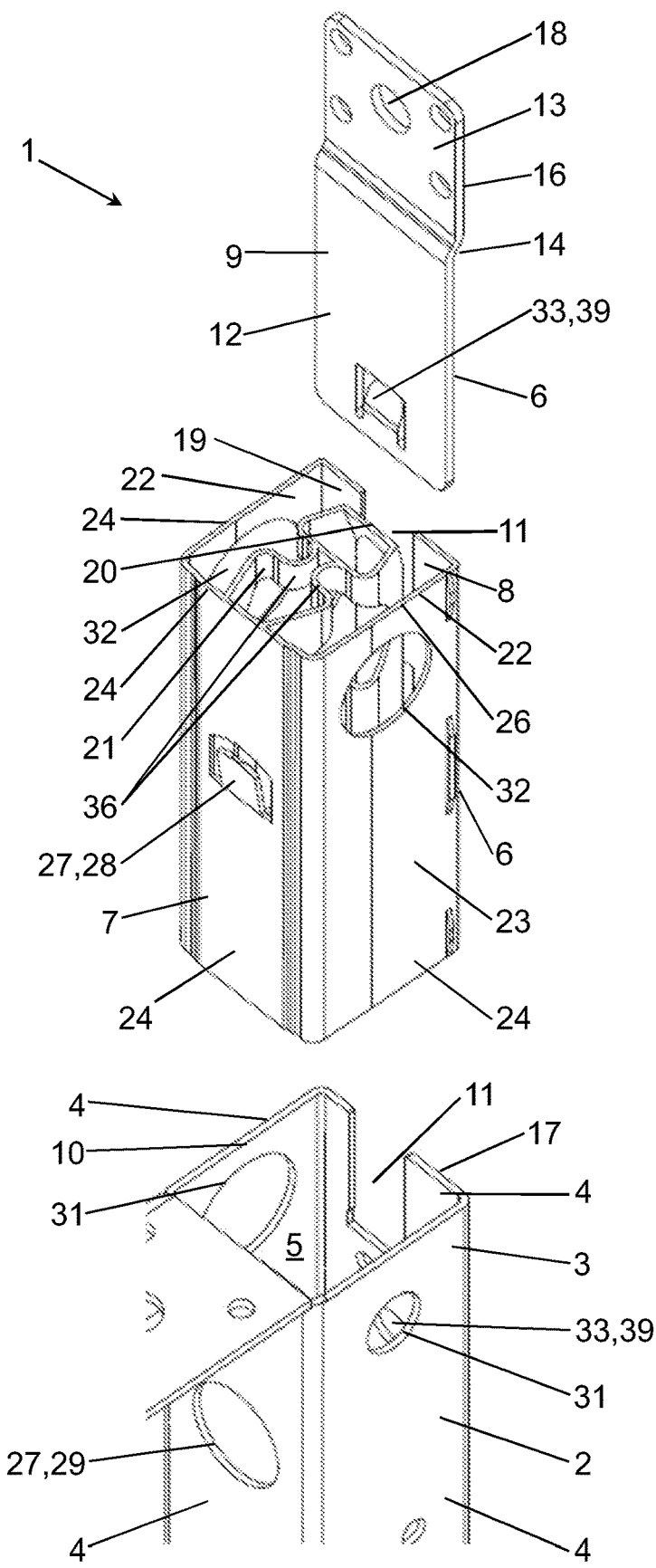
FIG. 7 shows a perspective exploded view of the mounting system according to the preceding drawings.

In FIGS. 7 and 8, exploded views of the mounting system 1 are shown. In the embodiment shown, the fastening tab 9 has a guide portion 12 and a fastening portion 13. In the mounting position, the fastening portion 13 is located outside the guide receptacle 8, and the guide portion 12 is located inside the guide receptacle 8. In the starting position, both the fastening portion 13 and the guide portion 12 are located in the guide receptacle 8.

A shoulder portion 14 is arranged between the guide portion 12 and the fastening portion 13. The shoulder portion 14 is formed in such a way that a mounting face 16 of the fastening portion 13 comes to lie substantially flush with an outer face 17 of the hollow profile 3 when the fastening tab 9 is located in the mounting position. This is shown correspondingly in FIG. 6. The mounting face 16 lies substantially flush with the outer face 17. It is thus ensured that the mounting frame 2 can be arranged on a supporting structure flush with the outer face 17.

Preferably, when viewed in the direction of the longitudinal axis L, the guide portion 12 is designed to be longer than the fastening portion 13. However, the guide portion 12 can also be designed to be shorter than or the same length as the fastening portion 13.

FIGS. 3 and 6 show that the guide receptacle 8 has a first guide face 19 and a second guide face 20. The fastening tab 9 is arranged between the first guide face 19 and the second guide face 20. The second guide face 20 has a spring tension applied thereto by a spring element 21. The second guide face 20 thus presses the fastening tab 9 against the first guide face 19. In FIG. 3, in which the fastening tab 9 is located in the starting position, the distance between the two guide faces 19, 20 is greater than in FIG. 6, in which the fastening tab 9 is located in the mounting position. By means of the arrangement of the spring element 21 and the movable second guide face 20, the fastening tab 9 is lightly clamped in the guide receptacle 8. The clamping is such that the fastening tab 9 cannot move due to its own weight, and an installer can pull out the fastening tab 9 without applying a great deal of force.

In this case, the spring element 21 is an integral component of the support element 7. The guide faces 19, 20 are also integral components of the support element 7.

In the embodiment shown, the spring element 21 comprises two curved spring legs 36. The spring legs 36 are part of the support element 7 and protrude from a side wall 23 of the support element 7. In the embodiment shown, the support element has a hollow space 25. The spring element 21 is arranged in the aforementioned hollow space 25 and protrudes from an inner wall face 26 of one of the side walls 23.

The guide receptacle 8 further comprises two lateral guide faces 22 which in this case extend substantially at right angles away from the first guide face 19.

In the mounting position, the fastening tab 9 is snapped into the hollow profile 3 by means of a snap connection 33. The snap connection 33 comprises a snap-in tab 38, which protrudes from the fastening tab 9, and a snap-in opening 39 which is arranged in the hollow profile 3. In FIG. 6, the engagement of the snap-in tab 38 in the snap-in opening 39 is shown. The snap connection 33 is designed in such a way that the fastening tab 9 is prevented from being pulled further out of the guide receptacle 8, and it is possible to slide the fastening tab 9 out of the mounting position back into the starting position.

The support element 7 has side walls 23 having outer wall faces 24. The outer wall faces 24 have a cross-sectional shape which is substantially the same as the cross-sectional shape of the internal space of the hollow profile 3. In the embodiment shown, the hollow profile 3 has a rectangular, in this case square, cross section. Accordingly, four side walls 23 are arranged with correspondingly outer wall faces 24.

Preferably, at least one spring portion 37 protrudes from at least one of the wall faces and acts against the inner wall of the hollow profile.

The support element 23 is preferably fastened in the internal space 5 of the hollow profile 3 by means of at least one snap connection 27. The snap connection 27 is provided by a snap-in tab 28 moulded on the support element, which tab engages in a snap-in opening 29 located in the hollow profile.

Furthermore, the support element 7 and the hollow profile 3 each have a stop 30, the two stops 30 being in contact with one another when the support element 7 is inserted.

Furthermore, the hollow profile 3 and two sides which are opposite one another with respect to the internal space each have one opening 31. Furthermore, the support element also has an opening 32. When inserted, the two openings 31, 32 form a mounting opening through which a fastening screw 34 can be guided. In the embodiment shown, the support element also has a corresponding opening, and the fastening screw can also be guided through the support element.

As explained at the outset, the mounting frame preferably has two hollow profiles 3 arranged at a distance from one another, which profiles are in the form of vertical supports. Each of the hollow profiles 3 preferably has one fastening unit 6 each, which is inserted at the upper end of the respective hollow profile 3. This is shown in FIGS. 8 and 9.

FIG. 8 shows the mounting system with further details. In particular the at least one bearing structure 40 is shown. In this embodiment it is located on a cross member 35 which is rigidly connected to the vertical supports 3.

Furthermore, FIG. 9 shows an assembly with the sanitary fitting and the mounting system as described above.

LIST OF REFERENCE SIGNS

| | |
|---|---|
| 1 | mounting system |
| 2 | mounting frame |
| 3 | hollow profile |
| 4 | side wall |
| 5 | internal space |
| 6 | fastening unit |
| 7 | support element |
| 8 | guide receptacle |
| 9 | fastening tab |
| 10 | end face |
| 11 | aperture |
| 12 | guide portion |
| 13 | fastening portion |
| 14 | shoulder portion |
| 16 | mounting face |
| 17 | outer face |
| 18 | fastening opening |
| 19 | first guide face |
| 20 | second guide face |
| 21 | spring element |
| 22 | lateral guide face |
| 23 | side wall |
| 24 | outer wall faces |
| 25 | hollow space |
| 26 | inner wall face |
| 27 | snap connection |
| 28 | snap-in tab |
| 29 | snap-in opening |
| 30 | stop |
| 31 | opening |
| 32 | opening |
| 33 | snap connection |
| 34 | fastening screw |
| 35 | cross member |
| 36 | spring leg |
| 37 | spring portion |
| 38 | snap-in tab |
| 39 | snap-in opening |
| 40 | bearing structure |
| 41 | sanitary fitting |
| L | longitudinal axis |
| P | profile axis |

The invention claimed is:

1. A mounting system for fastening a sanitary fitting, comprising:
    a mounting frame with at least one bearing structure for mounting a sanitary fitting and with at least one hollow profile, wherein side walls of the at least one hollow profile define an internal space, and wherein said at least one hollow profile has an end face at an end of said at least one hollow profile, and
    at least one fastening unit having a support element which includes a guide receptacle, and having a fastening tab which is mounted in the guide receptacle so as to be able to slide relative to the support element from a starting position into a mounting position,
    wherein the support element is inserted in the internal space of the hollow profile, and
    wherein, in the mounting position, the fastening tab extends out of the guide receptacle and out of the internal space beyond the end face of the hollow profile.

2. The mounting system according to claim 1, wherein the guide receptacle is in the form of a longitudinal guide, the fastening tab being able to slide in the direction of a longitudinal axis of the longitudinal guide.

3. The mounting system according to claim 2, wherein the longitudinal axis extends parallel to a profile axis of the hollow profile.

4. The mounting system according to claim 1, wherein, in the starting position, the support element and the fastening tab are located flush with the end face of the hollow profile such that, in the starting position, both the support element and the fastening tab are located completely in the internal space, and, in the mounting position, the fastening tab extends out of the internal space beyond the end face; or
    wherein, in the starting position, the support element and the fastening tab are set back in the internal space with respect to the end face of the hollow profile such that, in the starting position, both the support element and the fastening tab are located completely in the internal space, and, in the mounting position, the fastening tab extends out of the internal space beyond the end face.

5. The mounting system according to claim 1, wherein the support element extends from the internal space beyond the end face, whereas, in the starting position, the fastening tab is located completely inside the guide receptacle.

6. The mounting system according to claim 1, wherein the side wall of the hollow profile and the support element each has an aperture configured such that through the aperture the fastening tab is configured to be gripped and moved from the starting position into the mounting position.

7. The mounting system according to claim 1 wherein the fastening tab has a guide portion and a fastening portion, in the mounting position, the fastening portion being located outside the guide receptacle, and the guide portion being located inside the guide receptacle.

8. The mounting system according to claim 7, wherein the fastening portion is connected to the guide portion by means of a shoulder portion, the shoulder portion configured such that a mounting face of the fastening portion comes to lie flush with an outer face of the hollow profile.

9. The mounting system according to claim 1, wherein the guide receptacle has a first guide face and a second guide face, the fastening tab being located between the first guide face and the second guide face, and at least one of the two guide faces having a spring tension applied thereto by a spring element such that the fastening tab is clamped between the two guide faces.

10. The mounting system according to claim 9, wherein the guide receptacle has two lateral guide faces which extend at right angles away from the first guide face or the second guide face.

11. The mounting system according to claim 1, wherein, in the mounting position, the fastening tab engages on the support element or on the hollow profile by means of a snap connection.

12. The mounting system according to claim 1, wherein the support element comprises side walls having outer wall faces which have a cross-sectional shape which is substantially the same as the cross-sectional shape of the internal space of the hollow profile.

13. The mounting system according to claim 1, wherein the guide receptacle has a first guide face and a second guide face, the fastening tab being located between the first guide face and the second guide face, and at least one of the two guide faces having a spring tension applied thereto by a spring element such that the fastening tab is clamped between the two guide faces,
- wherein the support element comprises side walls having outer wall faces which have a cross-sectional shape which is substantially the same as the cross-sectional shape of the internal space of the hollow profile and
- wherein the side walls of the support element define a hollow space, the spring element protruding from an inner wall face of one of the side walls, and the side wall opposite the spring element providing the first guide face.

14. The mounting system according to claim 1 wherein the support element is fastened in the internal space of the hollow profile by means of at least one snap connection.

15. The mounting system according to claim 1, wherein the support element and the hollow profile each have a stop, the two stops being in contact with one another when the support element is inserted.

16. The mounting system according to claim 1, wherein the hollow profile, on two sides which are opposite one another with respect to the internal space, has one opening in each case, and in that the support element has an opening, in the inserted state, wherein the openings in the hollow profile and the support element provide a continuous mounting opening for a fastening screw.

17. The mounting system according to claim 1, wherein the hollow profile is a vertical support, and wherein the mounting frame has two of said vertical supports extending at a distance from one another, the mounting frame further having at least one cross member which is rigidly connected to the vertical supports and which interconnects the vertical supports, the cross member having the at least one bearing structure.

18. An assembly comprising the mounting system according to claim 1 and the sanitary fitting which is fastened to the at least one bearing structure.

19. A method for assembling a mounting system according to claim 1, wherein, in a first step, the mounting frame is positioned and wherein, when required by the mounting situation, in a subsequent second step, the fastening tab is slid from the starting position into the mounting position.

* * * * *